(12) United States Patent
Zhuo et al.

(10) Patent No.: US 10,956,444 B2
(45) Date of Patent: Mar. 23, 2021

(54) BLOCK CHAIN STATE DATA SYNCHRONIZATION METHOD, APPARATUS, AND ELECTRONIC DEVICE

(71) Applicant: Advanced New Technologies Co., Ltd., Grand Cayman (KY)

(72) Inventors: Haizhen Zhuo, Hangzhou (CN); Zhonghao Lu, Hangzhou (CN); Benquan Yu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/775,195

(22) Filed: Jan. 28, 2020

(65) Prior Publication Data

US 2020/0167367 A1    May 28, 2020

Related U.S. Application Data

(63) Continuation of application No. PCT/CN2020/072123, filed on Jan. 15, 2020.

(30) Foreign Application Priority Data

Jul. 31, 2019    (CN) .......................... 201910703834.1

(51) Int. Cl.
    *G06F 16/27* (2019.01)
    *G06F 16/22* (2019.01)
(52) U.S. Cl.
    CPC .......... *G06F 16/27* (2019.01); *G06F 16/2246* (2019.01)
(58) Field of Classification Search
    CPC .............................. G06F 16/27; G06F 16/2246
    See application file for complete search history.

(56) References Cited

U.S. PATENT DOCUMENTS

| 10,103,893 B2 | 10/2018 | Kroonmaa et al. |
| 2002/0064311 A1 | 5/2002 | Yahagi |

(Continued)

FOREIGN PATENT DOCUMENTS

| CN | 107145605 | 9/2017 |
| CN | 108197226 | 6/2018 |

(Continued)

OTHER PUBLICATIONS

PCT International Search Report and Written Opinion in International Application No. PCT/CN2020/072122, dated Apr. 26, 2020, 15 pages (with partial machine translation).

(Continued)

*Primary Examiner* — Kannan Shanmugasundaram
(74) *Attorney, Agent, or Firm* — Fish & Richardson P.C.

(57) ABSTRACT

A method of synchronizing blockchain state data, where account state data in the blockchain is organized into a Merkle state tree and stored in a database; the Merkle state tree includes a current Merkle state tree formed by a latest account state of each blockchain account; and a history Merkle state tree formed by a history account state of each blockchain account; and the method includes: receiving a data synchronization instruction for the Merkle state tree; in response to the data synchronization instruction, obtaining in real time the current Merkle state tree of the latest block stored in the database of other node device in the blockchain; and storing the obtained current Merkle state tree of the latest block to the local database to complete real-time data synchronization for the Merkle state tree.

18 Claims, 6 Drawing Sheets

(56) References Cited

U.S. PATENT DOCUMENTS

| | | | | |
|---|---|---|---|---|
| 2010/0235335 | A1* | 9/2010 | Heman | G06F 16/23 |
| | | | | 707/703 |
| 2012/0209822 | A1* | 8/2012 | Prabhakar | G06F 16/2365 |
| | | | | 707/703 |
| 2016/0110261 | A1* | 4/2016 | Parab | H04L 9/0891 |
| | | | | 707/692 |
| 2016/0191243 | A1* | 6/2016 | Manning | H04L 61/1511 |
| | | | | 713/168 |
| 2016/0275201 | A1 | 9/2016 | Li et al. | |
| 2016/0344737 | A1 | 11/2016 | Anton et al. | |
| 2017/0236120 | A1* | 8/2017 | Herlihy | G06F 21/602 |
| | | | | 705/67 |
| 2017/0262638 | A1 | 9/2017 | Horowitz et al. | |
| 2017/0344435 | A1* | 11/2017 | Davis | G06F 11/1464 |
| 2017/0345011 | A1 | 11/2017 | Salami et al. | |
| 2018/0198626 | A1 | 7/2018 | Kroonmaa et al. | |
| 2020/0117690 | A1 | 4/2020 | Tran et al. | |
| 2020/0167345 | A1 | 5/2020 | Zhou et al. | |

FOREIGN PATENT DOCUMENTS

| | | |
|---|---|---|
| CN | 108230109 | 6/2018 |
| CN | 108282474 | 7/2018 |
| CN | 108615156 | 10/2018 |
| CN | 108923932 | 11/2018 |
| CN | 109408521 | 3/2019 |
| CN | 109586934 | 4/2019 |
| CN | 109857810 | 6/2019 |
| CN | 109933592 | 6/2019 |
| CN | 109992998 | 7/2019 |
| CN | 110457319 | 11/2019 |
| CN | 110493325 | 11/2019 |
| WO | WO 2019101229 | 5/2019 |

OTHER PUBLICATIONS

PCT International Search Report and Written Opinion in International Application No. PCT/CN2020/072123, dated Apr. 24, 2020, 13 pages (with partial machine translation).

Tan, "Research and Implementation of Networking Log Management and Analysis Technology," China Master's Theses Full-text Database Information Technology, Oct. 2015, 68 pages (with machine translation).

You et al., "Hybrid Indexing Scheme Supporting Blockchain Transaction Tracing," Computer Integrated Manufacturing Systems, Apr. 2019, 25(4):976-984 (with English abstract).

Crosby et al., "BlockChain Technology: Beyond Bitcoin," Sutardja Center for Entrepreneurship & Technology Technica Report, Oct. 16, 2015, 35 pages.

Nakamoto, "Bitcoin: A Peer-to-Peer Electronic Cash System," www.bitcoin.org, 2005, 9 pages.

\* cited by examiner

US 10,956,444 B2

BLOCK CHAIN STATE DATA SYNCHRONIZATION METHOD, APPARATUS, AND ELECTRONIC DEVICE

CROSS-REFERENCE TO RELATED APPLICATIONS

This application is a continuation of PCT Application No. PCT/CN2020/072123, filed on Jan. 15, 2020, which claims priority to Chinese Patent Application No. 201910703834.1, filed on Jul. 31, 2019, and each application is hereby incorporated by reference in its entirety.

TECHNICAL FIELD

One or more embodiments of the present disclosure relate to the technical field of blockchain, and in particular, to a method and an apparatus for synchronizing blockchain state data, and an electronic device.

BACKGROUND

Blockchain technology, also known as distributed ledger technology, is an emerging technology in which several computing devices participate in "accounting" and jointly maintain a complete distributed database. Since blockchain technology has the characteristics of decentralization, openness and transparency, each computing device can participate in database records, and data can be quickly synchronized between computing devices, blockchain technology has been widely used in many fields.

SUMMARY

The present disclosure proposes a method of synchronizing blockchain state data, wherein account state data in the blockchain is organized into a Merkle state tree and stored in a database; the Merkle state tree includes a current Merkle state tree formed by a latest account state of each blockchain account; and a history Merkle state tree formed by a history account state of each blockchain account; and the method includes: receiving a data synchronization instruction for the Merkle state tree; in response to the data synchronization instruction, obtaining the current Merkle state tree of the latest block stored in the database of other node device in the blockchain in real time; and storing the obtained current Merkle state tree of the latest block to the local database to complete real-time data synchronization for the Merkle state tree.

Optionally, the method includes: in response to the data synchronization instruction, obtaining the history Merkle state tree of each block stored in the database of other node device in the background offline; and storing the obtained history Merkle state tree of each block in the local database to complete offline data synchronization of the history Merkle state tree for the Merkle state tree.

Optionally, the method includes: determining whether a first block number of the latest block corresponding to the Merkle state tree stored by the other node device is smaller than a second block number of the current latest block of the blockchain; and when the first block number of the latest block corresponding to the Merkle state tree stored by the other node device is smaller than the second block number of the current latest block of the blockchain, re-executing transactions in all blocks from the first block number to the second block number, to update data nodes on the current Merkle state tree and the history Merkle state tree that have been synchronized to the local database.

Optionally, the method includes: after execution of a transaction in a target block is completed, based on a latest account state of a target account related to the transaction in the target block after update, generating updated data nodes corresponding to the current Merkle state tree of the target block and, based on a history account state of the target account before the update, generating history data nodes corresponding to the history Merkle state tree of the target block; based on the generated updated data nodes, modifying and updating data nodes that correspond to the target account, and that are stored in a local database, and that are on the current Merkle state tree of the previous block of the target block, to obtain the current Merkle state tree of the target block; and based on the generated history data nodes and data nodes other than the reused data nodes that correspond to the target account on the history Merkle state tree of the previous block of the target block, creating the history Merkle state tree for the target block.

Optionally, the data nodes on the current Merkle state tree are organized into a data structure of a B+tree, and stored in the database; and the data nodes on the history Merkle state tree are organized into a data structure of an LSM tree, and stored in the database.

Optionally, the database is a Key-Value database; and the data nodes on the Merkle state tree are stored in the database in the form of Key-Value pairs; wherein a key of a data node on the current Merkle state tree is a node ID of the data node; and a key of a data node on the history Merkle state tree is a hash value of data content contained in the data node.

Optionally, the database is a LevelDB database; or a database based on a LevelDB architecture.

Optionally, the database is a Rocksdb database based on the LevelDB architecture.

Optionally, the Merkle tree is a variant of a Merkle tree with a tree structure incorporating a Trie dictionary tree.

Optionally, the Merkle state tree is a Merkle Patricia Tree state tree.

The present disclosure proposes an apparatus for synchronizing blockchain state data, wherein account state data in the blockchain is organized into a Merkle state tree and stored in a database; the Merkle state tree includes a current Merkle state tree formed by a latest account state of each blockchain account; and a history Merkle state tree formed by a history account state of each blockchain account; and the apparatus includes: a receiving module, configured to receive a data synchronization instruction for the Merkle state tree; an obtaining module, configured to, in response to the data synchronization instruction, obtain the current Merkle state tree of the latest block stored in the database of other node device in the blockchain in real time; and a storing module, configured to store the obtained current Merkle state tree of the latest block to a local database to complete real-time data synchronization for the Merkle state tree.

Optionally, the obtaining module is further configured to, in response to the data synchronization instruction, obtain the history Merkle state tree of each block stored in the database of the other node device in the background offline; and the storing module is configured to store the obtained history Merkle state tree of each block in the local database, to complete offline data synchronization of the history Merkle state tree for the Merkle state tree.

Optionally, the apparatus further includes: an updating module, configured to determine whether the first block number of the latest block corresponding to the Merkle state tree stored by the other node device is smaller than the second block number of the current latest block of the blockchain; and when the first block number of the latest block corresponding to the Merkle state tree stored by the other node device is smaller than the second block number of the current latest block of the blockchain, re-execute transactions in all blocks from the first block number to the second block number, to update data nodes on the current Merkle state tree and the history Merkle state tree that have been synchronized to the local database.

Optionally, the apparatus further includes: a generation module, configured to after execution of a transaction in a target block is completed, based on a latest account state of a target account related to the transaction in the target block after the update, generate updated data nodes corresponding to the current Merkle state tree of the target block and, based on a history account state of the target account before the update, generate history data nodes corresponding to the history Merkle state tree of the target block; a modification module, configured to, based on the generated updated data nodes, modify and update data nodes that correspond to the target account, and that are stored in the local database, and that are on the current Merkle state tree of the previous block of the target block, to obtain the current Merkle state tree of the target block; and a creation module, configured to, based on the generated history data nodes and data nodes other than the reused data nodes that correspond to the target account, and that are stored in the local database, and that are on the history Merkle state tree of the previous block of the target block, create the history Merkle state tree for the target block.

Optionally, the data nodes on the current Merkle state tree are organized into a data structure of a B+tree, and stored in the database; and the data nodes on the history Merkle state tree are organized into a data structure of an LSM tree, and stored in the database.

Optionally, the database is a Key-Value database; and the data nodes on the Merkle state tree are stored in the database in the form of Key-Value pairs; wherein a key of a data node on the current Merkle state tree is a node ID of the data node; and a key of a data node on the history Merkle state tree is a hash value of data content contained in the data node.

Optionally, the database is a LevelDB database; or a database based on a LevelDB architecture.

Optionally, the database is a Rocksdb database based on the LevelDB architecture.

Optionally, the Merkle tree is a variant of a Merkle tree with a tree structure incorporating a Trie dictionary tree.

Optionally, the Merkle state tree is a Merkle Patricia Tree state tree.

In the above technical solution, the account state data in the blockchain is organized into the current Merkle state tree and the history Merkle state tree, so that when a node device synchronizes the data of the Merkle state tree from other node device, the node device only needs to synchronize the current Merkle state tree stored in the local database of other node device to the local, to complete the real-time data synchronization for the Merkle state tree. Moreover, since the current Merkle state tree only maintains the latest account state of each blockchain account, the amount of data is far less than the history Merkle state tree, in this way, it can increase the synchronization rate when synchronizing the Merkle state tree from other node devices.

DETAILED DESCRIPTION OF THE IMPLEMENTATIONS

Figure 1:
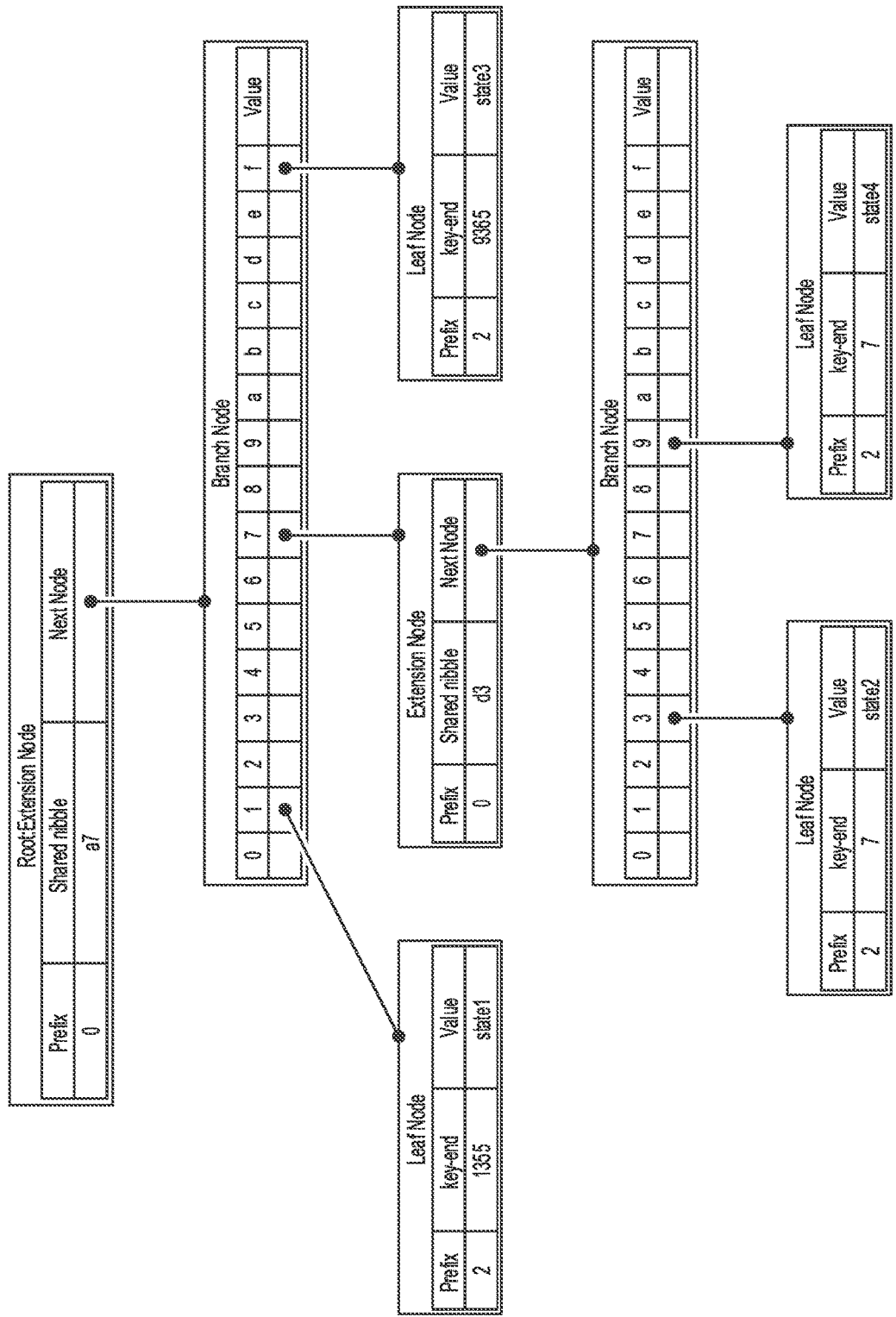
FIG. 1 is a schematic diagram of organizing account state data of a blockchain into an MPT state tree, according to an example embodiment.

Example embodiments will be described in detail here, examples of which are illustrated in the accompanying drawings. When the following description refers to the accompanying drawings, the same numerals in different drawings represent the same or similar elements unless otherwise indicated. The implementations described in the following example embodiments do not represent all implementations consistent with one or more embodiments of the present disclosure. Rather, they are merely examples of apparatuses and methods consistent with some aspects of one or more embodiments of the present disclosure, as detailed in the appended claims.

It should be noted that, in other embodiments, the steps of the corresponding method are not necessarily performed in the order shown and described in the present disclosure. In some other embodiments, the method can include more or fewer steps than described in the present disclosure. In addition, a single step described in the present disclosure can be divided into multiple steps for description in other embodiments; and multiple steps described in the present disclosure can be combined into a single step for other embodiments.

Blockchains are generally divided into three types: public blockchains, private blockchains, and consortium blockchains. In addition, there can be combinations of the above types, such as private blockchain+consortium blockchain, consortium blockchain+public blockchain, etc.

Here, the most decentralized is the public blockchain. The public blockchain is represented by Bitcoin and Ethereum. Participants (also known as nodes in the blockchain) joining the public blockchain can read data records on the chain, participate in transactions, and compete for the accounting right for latest blocks. Moreover, each node can freely join or leave the network and perform related operations.

On the contrary, for the private blockchain, the write permission of the network is controlled by an organization or institution, and the data read permission is regulated by the organization. In simple terms, a private blockchain can be a weakly centralized system with strict restrictions on nodes and having a small number of nodes. This type of blockchain is more suitable for internal use by specific institutions.

The consortium blockchain is a blockchain between the public blockchain and the private blockchain, which can achieve "partial decentralization". Each node in the consortium blockchain usually has a corresponding entity or organization; nodes are authorized to join the network and form a stakeholder alliance to jointly maintain the operation of the blockchain.

Based on the basic characteristics of a blockchain, a blockchain is usually composed of several blocks. In each of these blocks, a timestamp corresponding to the creation time of the block is recorded, and all of the blocks form a time-ordered data chain strictly based on the timestamps recorded in the blocks.

The real data generated by the physical world can be constructed into a standard transaction format supported by the blockchain, and then post to the blockchain, and the node devices in the blockchain will perform consensus processing on the received transactions. After reaching a consensus, the transaction will be packaged into a block by the node device that acts as an accounting node in the blockchain, and are stored persistently as a credential in the blockchain.

Here, the consensus algorithms supported in the blockchain can include the following types: a first type of consensus algorithm, that is, a consensus algorithm in which the node devices have to compete for the accounting right of each round of accounting cycle; for example, consensus algorithms such as Proof of Work (POW), Proof of Stake (POS), Delegated Proof of Stake (DPOS); and a second type of consensus algorithm, that is, a consensus algorithm that a accounting node is elected in advance for each round of accounting cycle (without the need to compete for the accounting right); for example, consensus algorithms such as Practical Byzantine Fault Tolerance (PBFT).

In a blockchain network applying the first type of consensus algorithm, node devices that compete for the accounting right can execute a transaction upon receiving the transaction. One of the node devices competing for the accounting right can win in the current round of contention for the accounting right and become the accounting node. The accounting node can package the received transaction with other transactions to generate the latest block, and send the generated latest block or the block header of the latest block to other node devices for consensus.

In the blockchain network applying the second type of consensus algorithm, the node device having the accounting right has been agreed before the current round of accounting. Therefore, upon receiving a transaction, a node device, if the node device is not the accounting node of the current round, can send the transaction to the accounting node. The accounting node of the current round can execute the transaction during or before the transaction is packaged with other transactions to generate the latest block. After the accounting node generates the latest block, the accounting node can send the latest block or the block header of the latest block to other node devices for consensus.

As mentioned above, no matter which consensus algorithm is adopted by the blockchain, the accounting node of the current round can package the received transaction to generate the latest block, and the generated latest block or the block header of the latest block is sent to other node devices for consensus verification. If other node devices receive the latest block or the block header of the latest block, and it is verified that there is no problem, the latest block can be added to the end of the original blockchain to complete the accounting process of the blockchain. The other nodes can also execute the transaction contained in the block during the process of verifying the latest block or block header sent by the accounting node.

In the field of blockchain, there is an important concept: account. Taking Ethereum as an example, accounts are divided into two types: external accounts and contract accounts. An external account is an account directly controlled by a user, also referred to as a user account; and a contract account is an account containing contract codes (that is, smart contracts) which is created by a user through an external account.

However, for some blockchain models (such as the ant blockchain) derived from the Ethereum-based architecture, the account types supported by the blockchain can be further expanded, which is not specifically limited in this description.

For an account in the blockchain, a structure is usually used to maintain the account state of the account. When a transaction in a block is executed, the state of the account associated with the transaction in the blockchain usually also changes.

Taking Ethereum as an example, the structure of an account usually includes fields such as Balance, Nonce, Code, and Storage.

The Balance field is configured to maintain the current account balance of the account.

The Nonce field is configured to maintain the number of transactions for this account; and it is a counter used to ensure that each transaction can be processed only once, effectively avoiding replay attacks.

The Code field is configured to maintain the contract codes of the account. In actual application, the Code field usually only maintains the hash value of the contract codes; therefore, the Code field is also commonly called the Codehash field.

The Storage field is configured to maintain the storage content of the account (the field value is null by default). For a contract account, an independent storage space is usually allocated to store the storage content of the contract account; and the independent storage space is usually referred to as the account storage of the contract account. The storage content of the contract account is usually constructed as a data structure of an MPT (Merkle Patricia Trie) tree and stored in the above independent storage space. Here, the MPT tree constructed based on the storage content of the contract account is also commonly referred to as a Storage tree. The Storage field usually only maintains the root node of the Storage tree; therefore, the Storage field is also commonly called the StorageRoot field.

For an external account, the field values of the Code field and the Storage field are both nulls.

For most blockchain models, Merkle trees are usually used; or, data structures based on Merkle trees are used to store and maintain data. Take Ethereum as an example. Ethereum uses the MPT tree (a variant of Merkle tree) as a data organization form to organize and manage important data such as account states and transaction information.

For data that needs to be stored and maintained in the blockchain, Ethereum designed three MPT trees, which are MPT state tree, MPT transaction tree, and MPT receipt tree. In addition to the above three MPT trees, there is actually a Storage tree constructed based on the storage content of the contract account.

The MPT state tree is an MPT tree formed by the account state data of all accounts in the blockchain. The MPT transaction tree is an MPT tree formed by transaction data in the blockchain. The MPT receipt tree is an MPT tree formed by transaction receipts respectively corresponding to the transactions in the block generated after the execution of the transaction in the block is completed. The hash values of the root nodes of the MPT state tree, the MPT transaction tree, and the MPT receipt tree will eventually be added to the block header of the corresponding block.

Here, the MPT transaction tree and the MPT receipt tree both correspond to blocks, that is, each block has its own MPT transaction tree and MPT receipt tree. However, the MPT state tree is a global MPT tree, which does not correspond to a specific block, but covers the account state data of all accounts in the blockchain.

The organized MPT transaction tree, MPT receipt tree, and MPT state tree are eventually stored in a Key-Value database (such as LevelDB) that adopting a multi-level data storage structure.

The database adopting a multi-level data storage structure usually adopts a multi-level data storage structure and can be divided into n-level data storages. For example, the data storage at each level can be set to L0, L1, L2, L3, L (n–1) in that order; for each level of data storage in the above database, the smaller the level number is, the higher the level is. For example, L0 stores the latest data of several blocks, and L1 stores the second latest data of several blocks, and so on.

Here, the reading and writing performance of the storage medium corresponding to the data storage at each level can also have performance differences. For example, the reading and writing performance of the storage medium corresponding to a high-level (that is, with a small level number) data storage can be higher than the reading and writing performance of the storage medium corresponding to a low-level (that is, with a large level number) data storage. In actual application, high-level data storage can use storage medium with higher storage cost and better storage performance; while lower-level data storage can use storage medium with lower unit cost and larger capacity.

In actual application, as the block number (also known as the block height) of the blockchain increases, the data stored in the database will contain a lot of history data. Moreover, the smaller the block number is, the older the data in the block is and the less important the data is. Therefore, in order to reduce the overall storage cost, data of different block heights can usually be "treated differently". For example, data in blocks with smaller block numbers can be stored on lower-cost storage media; data in blocks with larger block numbers can be stored on higher-cost storage media.

It should be noted that for each latest block generated by the blockchain, after the transactions in the latest block are executed, states of the relevant accounts (either external accounts or contract accounts) of these executed transactions in the blockchain usually changes with them.

For example, after execution of a "transfer transaction" in the block is completed, the balances (that is, the value of the Balance field of these accounts) of the transfer account and the transferee account related to the "transfer transaction" usually also change with it.

After execution of the transaction of the node device in the latest block generated by the blockchain is completed, since the account state in the current blockchain has changed, the node device needs to build an MPT state tree from the current account state data of all accounts in the blockchain, to maintain the latest states of all accounts in the blockchain.

That is, whenever a latest block is generated in the blockchain, execution of the transaction in the latest block is completed, and the account states in the blockchain change, the node device needs to rebuild an MPT state tree based on the latest account state data of all accounts in the blockchain.

In other words, each block in the blockchain has a corresponding MPT state tree; the MPT state tree maintains the latest account states of all the accounts in the blockchain after execution of the transactions in the block is completed.

Referring to FIG. 1, which is a schematic diagram of organizing account state data of a blockchain into an MPT state tree.

An MPT tree is an improved Merkle tree variant, which combines advantages of Merkle tree and Trie dictionary tree (also called prefix tree).

There are usually three types of data nodes in the MPT tree, which are respectively leaf nodes, extension nodes and branch nodes.

A leaf node is a key-value pair expressed as [key, value], where the key is a special hexadecimal coded character, and the value is the state data of the account address corresponding to the leaf node (that is, the structure shown above). An extension node is also a key-value pair expressed as [key, value], where the key is also a special hexadecimal coded character, and the value is a hash value (hash pointer) of other nodes, which means that other node can be linked through the hash pointer link.

A branch node contains 17 elements. The first 16 elements correspond to the 16 possible hexadecimal characters in the key; one text symbol corresponds to a nibble. If a [key, value] pair terminates at this branch node, the branch node can play the role of a leaf node, and the last element represents the value of the leaf node; otherwise, the last element of the branch node can be null.

Since in an MPT tree, characters on a search path from the root node to a leaf node constitute a complete account address; therefore, for a branch node, it can be either the termination node of the search path or a middle node of the search path.

Assuming that the account state data that needs to be organized into an MTP state tree is shown in Table 1 below:

TABLE 1

| Account Address (Key) | | | | | | | Account State (Value) |
|---|---|---|---|---|---|---|---|
| a | 7 | 1 | 1 | 3 | 5 | 5 | state1 |
| a | 7 | 7 | d | 3 | 3 | 7 | state2 |
| a | 7 | f | 9 | 3 | 6 | 5 | state3 |
| a | 7 | 7 | d | 3 | 9 | 7 | state4 |

In Table 1, the account address is a string of hexadecimal characters. The account state state is a structure composed of the fields such as Balance, Nonce, Code, and Storage.

Finally, the MPT state tree organized based on the account state data in Table 1 is shown in FIG. 1. The MPT state tree is composed of 4 leaf nodes, 2 branch nodes, and 2 extension nodes.

In FIG. 1, the prefix field is a prefix field shared by the extension node and the leaf node. Different field values of the prefix filed can be used to represent different node types.

For example, the value of the prefix field being 0 indicates that an extension node contains an even number of nibbles. As mentioned earlier, a nibble represents half of a byte, consisting of 4-bit binary, and a nibble can correspond to a character that constitutes an account address. The value of the prefix field being 1 indicates that an extension node contains an odd number of nibble(s). The value of the prefix field being 2 indicates that a leaf node contains an even number of nibbles. The value of the prefix field being 3 indicates that a leaf node contains an odd number of nibble(s).

For a branch node, since it is a prefix node of single nibbles in parallel, the branch node does not have the prefix field described above.

A Shared nibble field in an extension node corresponds to the key value of the key-value pair contained in the extension node, which represents a common character prefix between account addresses. For example, all account addresses in the table above have a common character prefix a7. The Next Node field is filled with a hash value (a hash pointer) of the next node.

The hexadecimal character 0~f field in the branch node corresponds to the key value of the key-value pair contained in the branch node. If the branch node is an middle node on the search path of the account address on the MPT tree, the Value field of the branch node can be null. The 0~f field is used to fill the hash value of the next node.

The key-end in the leaf node corresponds to the key value of the key-value pair contained in the leaf node, and represents the last a few characters of the account address. The key value of each node on the search path from the root node to the leaf node constitutes a complete account address. The Value field of the leaf node is filled with account state data corresponding to the account address. For example, the structure formed by the above fields such as Balance, Nonce, Code, and storage can be encoded and then filled into the Value field of the leaf node.

Further, the nodes on the MPT state tree shown in FIG. 1 are finally stored in the database in the form of key-value pairs Key-Value.

Here, when a node on the MPT state tree is stored in the database, the key in the key-value pair of the node on the MPT state tree can be the hash value of the data content contained in the node; and the Value in the key-value pair of the node on the MPT state tree is the data content contained in node.

That is, when a node on the MPT state tree is stored in the database, a hash value of the data content contained in the node can be calculated (that is, a hash value is calculated with respect to the entire node), and the calculated hash value can be used as a key. The data content contained in the node is used as value to generate a key-value pair Key-Value; then, the generated key-value pair Key-Value is stored in the database.

Figure 2:
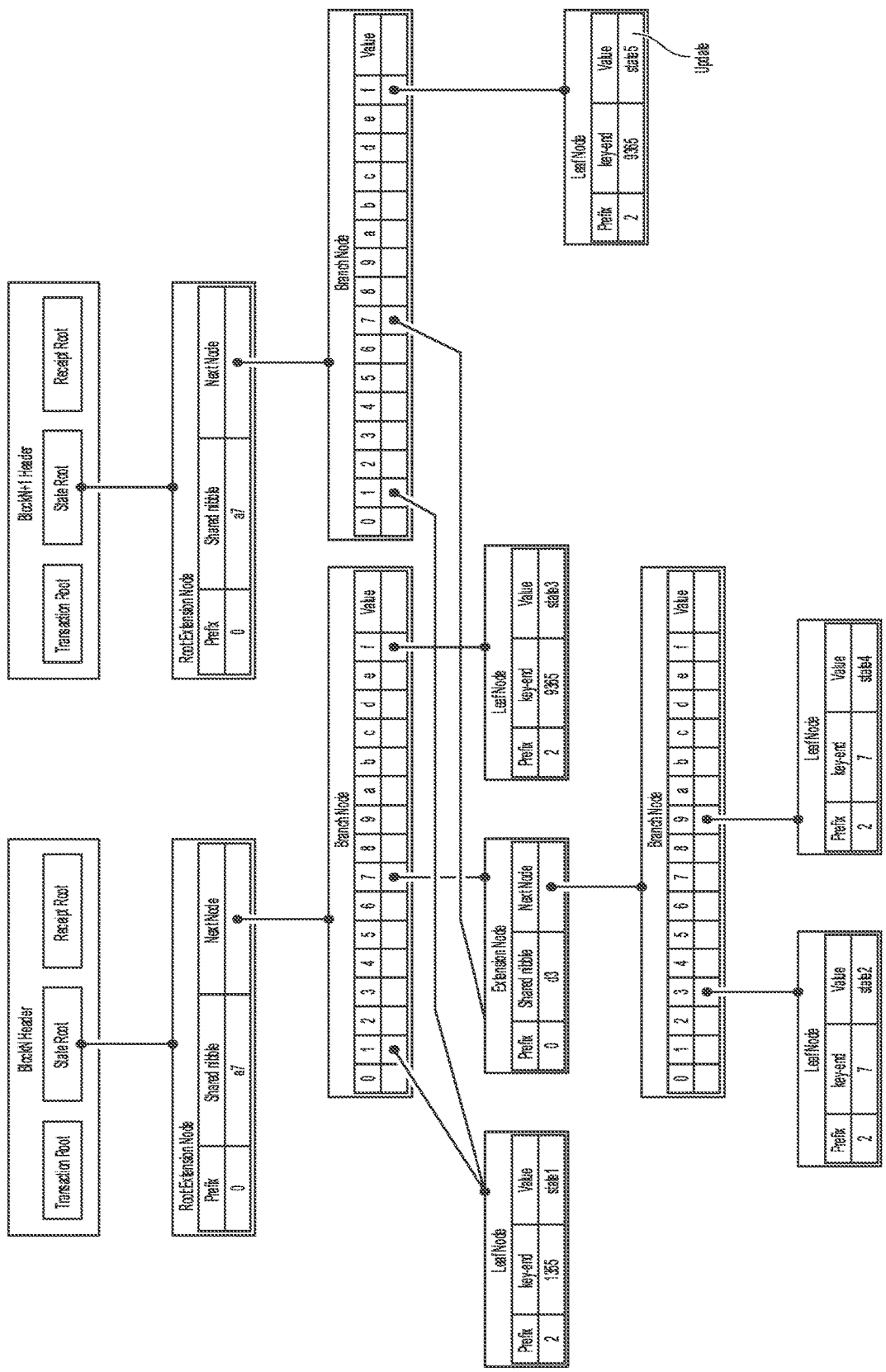
FIG. 2 is a schematic diagram of reusing nodes on an MPT state tree, according to an example embodiment.

Because the node on the MPT state tree is stored using a Key that is based on the hash value of the data content contained in the node, and is stored using a value that is the data content contained in the node, when a node on the MPT state tree is searched for, the hash value of the data content contained in the node can generally be used as a key for content addressing. When content addressing is adopted, nodes with "duplicate content" can usually be "reused" to save storage space for storing data. As shown in FIG. 2, FIG. 2 is a schematic diagram of reusing nodes on an MPT state tree shown in the present disclosure.

It should be noted that in actual application, after execution of the transaction in the latest block generated by the blockchain is completed, it can only cause the account state of some accounts to change. Therefore, when building the MPT state tree, it is not necessary to rebuild a complete MPT state tree based on the current state data of all accounts in the blockchain, but only need to update the nodes corresponding to the some accounts of which account states have changed based on the MPT state tree corresponding to the blocks before the latest block.

For the nodes on the MPT state tree that correspond to the accounts of which account states have not changed, since no data updates have occurred on these nodes, the nodes on the MPT state tree corresponding to the blocks before the latest block can be readily reused.

As shown in FIG. 2, assuming that the account state data in Table 1 is the latest account states of all accounts on the blockchain after execution of the transaction in Block N is completed, and the MPT state tree organized based on the account state data in Table 1 is still as shown in FIG. 1.

Assuming that after execution of the transaction in Block N+1 is completed, the account state of the account address "a7f9365" in Table 1 is updated from "state3" to "state5". At this time, when the Block N+1 updates the MPT state tree, it is not necessary to rebuild an MPT state tree based on the current state data of all accounts in the blockchain after execution of the transactions in Block N+1 is completed.

In this case, the value in the leaf node with the key-end being "9365" on the MPT state tree corresponding to Block N (that is, the MPT state tree shown in FIG. 1) can be updated from "state3" to "state5", and continue to update the hash pointers of all nodes on the path from the root node to the leaf node.

That is, when a leaf node on the MPT state tree is updated, as the hash value of the entire leaf node is updated, the hash pointers of all nodes on the path from the root node to the leaf node are also updated accordingly.

For example, still referring to FIG. 2, in addition to updating the value of Value in a leaf node with a "key-end" of "9365", it also needs to update the hash pointer pointing to the leaf node which is filled in the f field of the previous branch node of the leaf node. Further, it is possible to continue to trace back to the root node and continue to update the hash pointer pointing to the branch node which is filled in the "Next Node" field in the previous root node (Root Extension Node) of the branch node.

In addition to the nodes that have been updated above, other nodes that have not been updated can directly reuse the corresponding nodes on the MPT state tree of Block N;

Here, the MPT tree corresponding to Block N needs to be retained as history data. Therefore, when the MPT state tree is updated by Block N+1, these updated nodes are not modified and updated directly on the original nodes on the MPT state tree corresponding to Block N, but these updated nodes are recreated on the MPT tree corresponding to Block N+1.

That is, on the MPT state tree corresponding to Block N+1, only a small number of nodes that need to be updated are actually recreated. For other nodes that have not been updated, the corresponding nodes on the MPT state tree corresponding to Block N can be directly reused.

For example, as shown in FIG. 2, for the MPT state tree corresponding to Block N+1, actually only an expansion node as a root node, a branch node, and a leaf node need to be recreated; for the nodes that have not been updated, to complete the "reusing" of the nodes, add hash pointers pointing to the corresponding nodes on the MPT state tree corresponding to Block N to these recreated nodes on the MPT state tree. The nodes before the update on the MPT state tree corresponding to Block N will be saved as history account state data. For example, the leaf node with "key-end" of "9365" and Value of "state3" shown in FIG. 2 will be retained as history data.

In the above example, a few nodes on the MPT state tree of Block N+1 are updated, so that most nodes of the previous block Block N can be "reused". In actual application, the MPT state tree of Block N+1 can also be added with a node compared to that of the previous block Block N. In this case, although the newly added node cannot be "reused" directly from the MPT tree of the previous block Block N, it can be "reused" from the MPT state tree of an earlier block.

For example, although the newly added node on the MPT state tree of Block N+1 is not on the MPT state tree of Block N, the node can appear on the MPT state tree of an earlier block; for example, on the MPT state tree of Block N−1. Therefore, the newly added node on the MPT state tree of Block N+1 can directly reuse the corresponding node on the MPT state tree of Block N−1.

In actual application, a node device in the blockchain may, in some cases, need to synchronize the data of the Merkle state tree with other node device in the blockchain, to synchronize the Merkle state tree of the latest block stored in the local database of said other node device to be stored in the local database of the former node device.

For example, when a node device in the blockchain crashes, after the node device recovers from crash, the node device needs to synchronize the data of the Merkle state tree with other node devices in the blockchain. For another example, for a node device newly added in the blockchain, the node device also needs to synchronize the data of the Merkle state tree with other node devices in the blockchain.

Many Merkle trees with "content addressing" represented by the MPT tree can save the storage space of the account state data in the blockchain stored in the database by reusing some "content duplicate" data nodes, however, with the continuous increase of data, a large amount of history state data can be too redundant, which will inevitably lead to difficulties in data synchronization of Merkle state trees.

In the related art, when a node device performs data synchronization with other node devices for the Merkle state tree, it can usually be implemented by the following approaches.

Approach I

It is possible to synchronize the Merkle state trees of all missing blocks stored in the database of other node device to the local database for storage. For example, if the node device is recovered from crash, the missing blocks refer to all blocks between the latest block stored in the local database and the latest block stored in the blockchain. For a newly added node device, the missing blocks refer to all blocks in the block chain from the creation block to the latest block. It can be seen that in this way, although data synchronization can be completed normally, the amount of data to be synchronized is too large and the synchronization rate is slow.

Approach II

It is possible to synchronize the Merkle state tree of the latest block stored in the database of other node device to the local database for storage. In this way, although the amount of data to be synchronized is small, the Merkle state trees of all blocks stored in the database need to be traversed, and the cost of traverse is high and will affect the progress of data synchronization.

For example, in actual application, since there is a data-node reusing relationship between the Merkle state trees of the blocks, each of the Merkle state trees of all blocks needs to be traversed from the root node to the leaf node and from top to bottom to find out each data node on the Merkle state tree of the latest block.

In view of this, the present disclosure proposes an efficient data synchronization method for a Merkle state tree.

In implementation, the account state data in the blockchain can still be organized into a Merkle state tree and stored in the database.

The above Merkle state tree can include a current Merkle state tree and a history Merkle state tree.

The current Merkle state tree is a Merkle state tree formed by the latest account state of each blockchain account; the history Merkle state tree is a Merkle state tree formed by the history account state of each blockchain account. Each block has a current Merkle state tree and a history Merkle state tree corresponding to it.

When a node device that recovers from a crash or the newly added node device receives a data synchronization instruction for the Merkle state tree, in response to the data synchronization instruction, the current Merkle state tree of the latest block stored in the database of other node device in the blockchain can be obtained in real time; then, the obtained current Merkle state tree of the latest block is stored in the local database to complete real-time data synchronization for the Merkle state tree.

In the above technical solution, the account state data in the blockchain is organized into the current Merkle state tree and the history Merkle state tree, so that when a node device synchronizes the data of the Merkle state tree from other node device, the node device only needs to synchronize the current Merkle state tree stored in the local database of other node device to the local, to complete the real-time data synchronization for the Merkle state tree. Moreover, since the current Merkle state tree only maintains the latest account state of each blockchain account, the amount of data is far less than the history Merkle state tree, in this way, it can increase the synchronization rate when synchronizing the Merkle state tree from other node devices.

Figure 3:
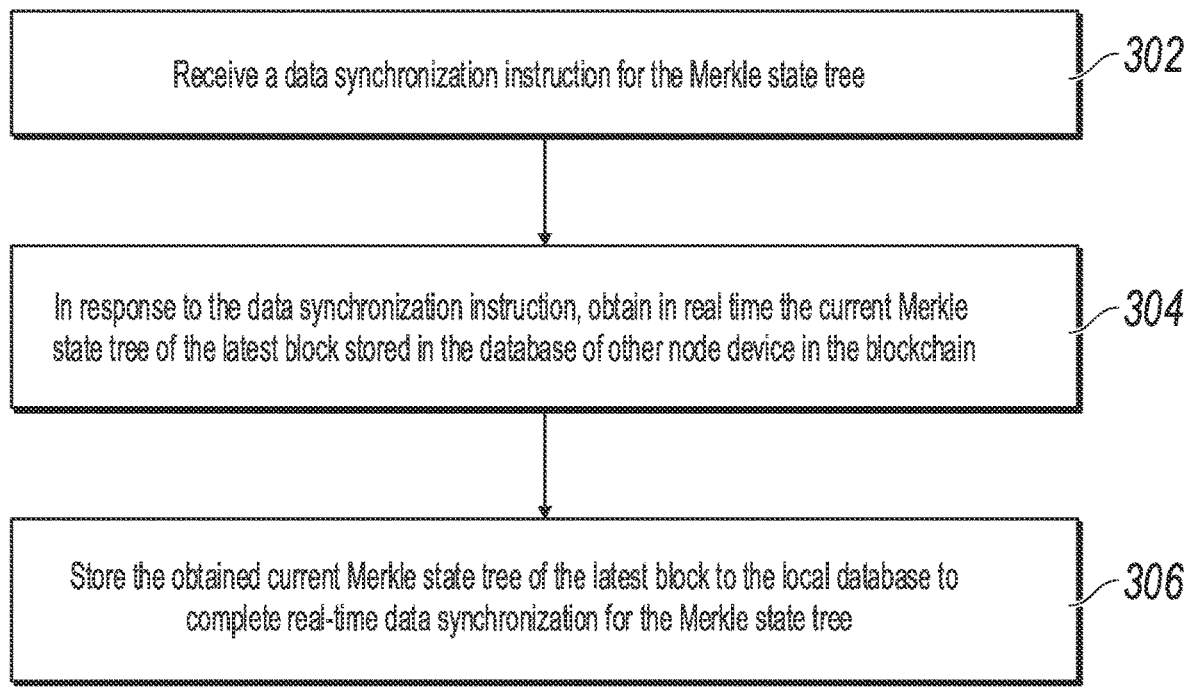
FIG. 3 is a flowchart of a method of synchronizing blockchain state data, according to an example embodiment.

Referring to FIG. 3, which is a flowchart of a method of synchronizing blockchain state data according to an example embodiment. The method is applied to a blockchain node device. The account state data in the blockchain is organized into a Merkle state tree and stored in a database. The Merkle state tree includes a current Merkle state tree formed of the latest account state of each blockchain account, and a history Merkle state tree formed of a history account state of each blockchain account. The method includes the following steps.

Step 302: a data synchronization instruction for the Merkle state tree is received.

Step 304: in response to the data synchronization instruction, the current Merkle state tree of the latest block stored in the database of other node device in the blockchain is obtained in real time.

Step 306: the obtained current Merkle state tree of the latest block is stored to the local database to complete real-time data synchronization for the Merkle state tree.

In an illustrated implementation, the Merkle tree can include any form of a Merkle tree variant incorporated with a tree structure of a Trie dictionary tree.

For example, in actual application, the above Merkle tree can still be the MPT tree adopted by the public blockchain represented by Ethereum; or, for the blockchain model derived based on the Ethereum architecture, in addition to the improved Merkle tree such as the MPT tree, the above Merkle tree can be other forms of Merkle tree variants similar to the MPT tree, which incorporate the tree structure of the Trie dictionary tree, which will not be listed one by one in the present disclosure.

Account state data in the blockchain can be organized into the data structure of the Merkle state tree and stored in the above database.

For example, the above Merkle state tree can still be an MPT tree, and the data structure of the MPT tree can be used to organize the account state data of the blockchain into an MPT state tree.

Here, in the present disclosure, the Merkle state tree formed by the account state data in the blockchain can include a current Merkle state tree and a history Merkle state tree. The current Merkle state tree is a Merkle state tree formed by the latest account state of each blockchain account; and the history Merkle state tree is a Merkle state tree formed by a history account state of each blockchain account.

Here, for each block in the blockchain, there is a current Merkle state tree and a history Merkle state tree corresponding to the block.

It should be noted that the current Merkle state tree and the history Merkle state tree are two independent Merkle state trees; there is no data node reusing relationship between the current Merkle state tree and the history Merkle state tree.

Here, that there is no data node reusing relationship between the current Merkle state tree and the history Merkle state tree means that the current Merkle state tree of any block in the blockchain will include data nodes corresponding to all of the accounts in the blockchain without reusing any data node on the history Merkle state tree of any block or any block previous to the block.

For example, in actual application, when creating a current Merkle state tree for a target block, the current Merkle state tree of the previous block contains data nodes corresponding to all of the accounts in the blockchain. Therefore, directly based on the current Merkle state tree of the previous block, some data nodes that has been updated are modified and updated to obtain the current Merkle state tree of the target block, without having to reuse any data node on the history Merkle state tree of the block or of any history block previous to the block.

For the history Merkle state tree of any block in the blockchain, it can only contain data nodes corresponding to the account related to the transaction in the block, and for data nodes corresponding to other blockchain accounts than the account related to the transaction in the block, data nodes on the history Merkle state tree of any history block previous to the block can be directly reused. The specific data node reusing method can still refer to FIG. 2 and the description related to FIG. 2.

In the present disclosure, a user client accessing the blockchain can package data into a standard transaction format supported by the blockchain, and then post it to the blockchain; node devices in the blockchain cooperating with other node devices can, based on the installed consensus algorithm, perform consensus on these transactions posted by the user client to the blockchain, to generate the latest blocks for the blockchain. The specific consensus process is not repeated here for simplicity.

After the node device in the blockchain executes the transactions in the target block, the account state of the target account related to these executed transactions in the blockchain usually also changes accordingly. Therefore, after the execution of the transactions of the node device in the target block is completed, the current Merkle state tree and the history Merkle state tree can be respectively created for the target block based on the history account state (that is, the account state before the transaction in the target block is executed) of the target account before account update, and the latest account state (that is, the account state after the transaction in the target block is executed) after the account update.

It should be noted that the above target block can refer to the latest block generated in the blockchain or any history block in the blockchain.

That is, in the present disclosure, whether a node device executes a transaction in a newly generated latest block or re-executes a transaction in any history block, after the execution of the transaction in that block is completed, a current Merkle state tree and a history Merkle state tree can be respectively created for the block of the execution, according to the history account state of the target account related to the executed transaction before account update and the latest account state after the account update.

In the present disclosure, after the execution of the transaction in the target block is completed, the node device can generate updated data nodes corresponding to the current Merkle state tree of the target block based on the latest account state of the target account related to the transaction in the target block after the update.

For example, in implementation, the node device can search for the data nodes that are corresponds to the target account related to the transaction in the target block on the current Merkle state tree of the previous block, and copy these data nodes that have been found; then based on the latest account state of the target account after the update, the values of the copied data nodes are modified and updated to obtain the updated data nodes. The process of searching and updating the values of the data nodes can still refer to FIG. 1 and the description related to FIG. 1.

Correspondingly, after the execution of the transaction in the target block is completed, the node device can also generate history data nodes corresponding to the history Merkle state tree of the target block based on the history account state of the target account related to the transaction in the target block before update.

For example, in implementation, the node device can also search for the data nodes that correspond to the target account related to the transactions in the target block on the history Merkle state tree of the previous block, and copy these data nodes that have been found; then based on the history account state of the target account before the update, the values of the copied data nodes are modified and updated to obtain the history data nodes.

In an illustrated implementation, both the updated data node and history data node can be represented in the form of a write set.

During the execution of transaction in the target block, the node device in the blockchain can first generate a read-write set corresponding to the transaction in the target block. The generated read-write set can also be stored in the database; for example, in actual application, the generated read-write set can be saved as a transaction execution log in a receipt corresponding to the transaction.

The read-write set is used to record the account state of the account related to the transaction before the transaction in the target block is executed (that is, the history account state before the account is updated); and the account state of the account related to the transaction after execution of the transaction in the target block is completed (that is, the latest account state after the account is updated).

For example, taking the transaction in the target block as a transfer transaction as an example, the read-write set corresponding to the transaction in the target block can be represented as <account, Balance1, Balance2>; where account indicates a transfer account related to the transaction in the target block, Balance1 indicates a fund balance of the transfer account before the transfer transaction is executed, and Balance2 indicates a fund balance of the transfer account after the transfer transaction is executed.

After the execution of the transaction in the target block is completed, the node device can further generate a write set corresponding to the Merkle state tree of the target block based on the read-write set corresponding to the transaction in the target block; the write set is configured to describe the data nodes of the Merkle state tree that need to be written to the target block.

Here, it should be noted that in the present disclosure, for any block in the blockchain, there are two Merkle state trees: the current Merkle state tree and the history Merkle state tree. Therefore, after the execution of the transaction in the target block is completed, the node device can further generate two modification sets based on the read-write set corresponding to the transaction in the target block; one of the write sets is a write set corresponding to the current Merkle state tree of the target block, which includes data nodes that need to be written to the current Merkle state tree of the target block (that is, the updated data nodes); and the other write set is a write set corresponding to the current Merkle state tree of the target block, which includes data nodes that need to be written to the history Merkle state tree of the target block (that is, the history data nodes).

In the present disclosure, when the node device generates updated data nodes corresponding to the current Merkle state tree of the target block based on the latest account state of the target account related to the transaction in the target block after the update; and, generates history data nodes corresponding to the history Merkle state tree of the target block based on the history account state of the target account related to the transaction in the target block before the update, the node device can respectively create the current Merkle state tree and the history Merkle state tree for the target block, based on the generated updated data nodes and history data nodes.

On the one hand, the node device can modify and update some data nodes that have been updated based on the current Merkle state tree of the previous block to create the current Merkle state tree for the target block.

In this case, the generated updated data nodes are data nodes that need to be modified and updated on the current Merkle state tree of the previous block. The node device can search for the data nodes that correspond to the target account on the current Merkle state tree of the previous block of the target block, and modify and update the found data nodes based on the generated updated data nodes. When the modification and update are completed, the current Merkle state tree of the target block can be obtained.

For example, in implementation, if the updated data nodes are represented as a write set, the data nodes that correspond to the target account on the current Merkle state tree of the previous block of the target block can be modified and updated based on the write set.

On the other hand, the node device can also recreate and add data nodes that have been partially updated based on the history Merkle state tree of the previous block, and reuse data nodes other than the data nodes that correspond to the target account on the history Merkle state tree of the previous block, to create a history Merkle state tree for the target block.

In this case, the generated history data nodes are data nodes that need to be recreated and added. The node device can search for other data nodes other than the data nodes that correspond to the target account on the history Merkle state tree of the previous block of the target block, and reuse such other data nodes that have been found; then, based on the generated history data nodes and the reused other data nodes, create a history Merkle state tree for the target block. For the reusing process of the data nodes, reference can be made to FIG. 2 and the description related to FIG. 2.

For example, in implementation, if the history data nodes are also represented in the form of a write set, based on the write set, and the reused data nodes other than the data nodes that correspond to the target account on the history Merkle state tree of the previous block of the target block, a history Merkle state tree for the target block is created.

From the above description, it can be known that, for the history Merkle state tree, more operations involving writing new history data nodes to the history Merkle state tree, not operation of modifying and updating data nodes. Therefore, the history Merkle state tree does not require higher performance for reading data.

For the current Merkle state tree, more operations are involved in modifying and updating data nodes. Moreover, in actual application, node devices often need to frequently call the latest account state of each blockchain account maintained in the current Merkle state trees. Therefore, the current Merkle state tree requires higher performance for reading data and modifying data.

In view of the above, in actual application, when the history Merkle state tree is stored in the database, a data structure with higher writing performance and less reading performance can be adopted; and when the current Merkle state tree is stored in the database, a data structure with higher reading and modifying performance and less modifying performance can be adopted.

In an illustrated implementation, the data nodes on the current Merkle state tree can be organized into a data structure of a B+tree (balance+tree) and stored in a database; and the data nodes on the history Merkle state tree can be organized into a data structure of an LSM tree (Log-Structured Merge Tree) and stored in the database. The specific methods of organizing the data nodes on the current Merkle state tree into a B+tree (balance+tree) and the data structures on the history Merkle state tree into an LSM tree are not elaborate in the present disclosure.

In an illustrated implementation, the above database can be a Key-Value database; for example, in an illustrated implementation, the above database can be a LevelDB database with a multi-layer storage structure; or, a database based on LevelDB architecture; for example, Rocksdb database is a typical database based on LevelDB database architecture.

In this case, whether it is the current Merkle state tree or the history Merkle state tree, it will eventually be stored in the form of a key-value pair Key-Value to the above database.

As mentioned earlier, since the history Merkle state tree still has the situation of reusing data nodes on the history Merkle state tree of the previous block, the current Merkle state tree does not need to consider the situation of data node reusing, but gets more involved in modifying the value of the data nodes; based on this difference in characteristics, when the data nodes on the current Merkle state tree and the history Merkle state tree are stored to the above database in the form of key-value pairs Key-Value, the current Merkle state tree and history Merkle state tree can be designed with different keys.

In an illustrated implementation, in view of the fact that the history Merkle state tree will still reuse data nodes on the history Merkle state tree of the previous block, when a data node on the history Merkle state tree is stored to the above database in the form of a key-value pair Key-Value, the hash value of the data content contained in the data node can still be used as the key.

In view of the current Merkle state tree requires frequent modification of the values of the data nodes, when a data node on the current Merkle state tree is stored in the database as a key-value pair Key-Value, the node ID of the data node can be used as the key.

In actual application, the node ID can be a character prefix corresponding to a path from the root node to the data node of the Merkle state tree; or a node number obtained by mapping the character prefix corresponding to the path from the root node to the data node of the Merkle state tree.

In the present disclosure, when a node device in the blockchain crashes, the node device can restore the latest account state corresponding to each blockchain account on the current Merkle state tree of the latest block to the history account state corresponding to each blockchain account on the history Merkle state tree of a specified target block. The target block can refer to any history block before the latest block.

Figure 4:
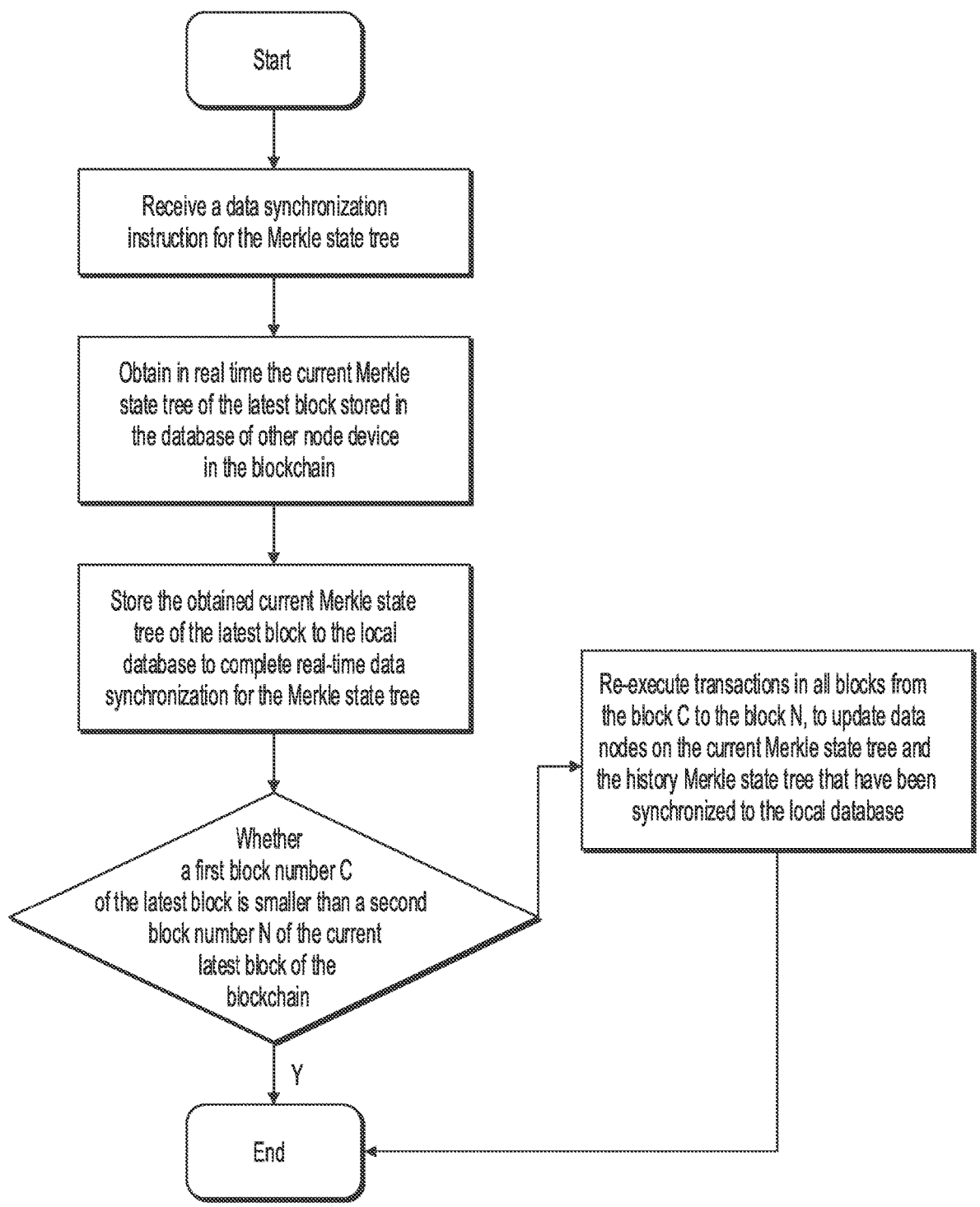
FIG. 4 is a schematic diagram of performing data synchronization on a Merkle state tree, according to an example embodiment.

Referring to FIG. 4, which is a schematic diagram of data synchronization of a Merkle state tree shown in the present disclosure.

It should be noted that the data node device in the blockchain that needs to synchronize the Merkle state tree from other node device can usually include a node device that have experienced recovery from crash or a node device newly added in the blockchain.

When a node device in the blockchain needs to perform data synchronization of the Merkle state tree, the managing user of the node device can input a data synchronization instruction for the Merkle state tree to the node device through a user interface installed on the node device. The data synchronization instruction can be a command line for triggering data synchronization.

Referring to FIG. 4, upon receiving the data synchronization instruction for the Merkle state tree, in response to the data synchronization instruction, through connection maintained with other node device, the node device obtain the current Merkle state tree of the latest block stored in the database of other node device in real time.

For example, in implementation, the node device can immediately create a real-time thread, run a real-time task, and obtain the current Merkle state tree of the latest block stored in the database of the other node device in real time through the connection maintained with the other node device.

The types of connections maintained between node devices in the blockchain are not limited in the present disclosure; for example, any type of long connection created by a peer-to-peer (P2P) communication protocol can be used. The other node device can be any node device in the blockchain network that is adjacent to the node device that needs to perform data synchronization for the Merkle state tree.

After the node device obtains the current Merkle state tree of the latest block stored in the database of other node device, the obtained current Merkle state tree can be stored in the local database.

Since the current account state of each blockchain account is usually maintained on the current Merkle state tree; for a node device in the blockchain, as long as the latest account state of each blockchain account is maintained in the local data database, the normal function of a node device in the blockchain can be restored. For example, when a node device maintains the latest account state of each blockchain account, it can normally participate in the consensus processing of the blockchain and can package to form a new block. Therefore, when the current Merkle state tree of the latest block stored in the database of other node device is synchronized to the local database of the node device, at this time the node device can restore the normal function as the node device in the blockchain. At this time, it can be considered that the real-time data synchronization for the Merkle state tree is completed.

It should be noted that in actual application, when a node device synchronizes data of the current Merkle state tree through a connection maintained with other node device, the "latest block" stored in the database of other node device doesn't have to be the same as the latest blocks in the blockchain.

For example, referring to FIG. 4, assuming that the block height corresponding to the current data Merkle state tree stored in the database of other node device is C, and the actual block height of the blockchain is N, then for said other node device, due to some reasons (such as network reasons), the current block height C corresponding to the current Merkle state tree stored by the other node device is less than the actual block height N of the above blockchain. In this case, the latest block corresponding to the Merkle state tree stored by the other node device lags behind the latest block on the blockchain. For example, assuming that the latest block of the blockchain network is a block with a block number 100, however, the other node device, due to some network reasons, stores a Merkle state tree of a history block before block 100 of the blockchain network as the Merkle state tree of the latest block in the database.

Still referring to FIG. 4, in this case, after the node device stores the current Merkle state tree of the "latest block" stored in the database of other node device in the local database, the node device can further determine whether a first block number of the latest block corresponding to the Merkle state tree stored by the other node device is smaller than a second block number of the current latest block of the blockchain.

If the first block number of the latest block corresponding to the Merkle state tree stored by the other node device is smaller than the second block number of the current latest block of the blockchain, it indicates that the latest block corresponding to the Merkle state tree stored by the other node device lags behind the latest block in the blockchain. At this point, the node device can re-execute transactions in all blocks from the first block number to the second block number, to update data nodes on the current Merkle state tree and the history Merkle state tree that have been synchronized to the local database.

Updating the data nodes on the current Merkle state tree and the history Merkle state tree synchronized to the local database by re-executing transactions in all blocks from the first block number to the second block number can still be performed through the process described in the above embodiment, that is, first generating read-write sets corresponding to the transactions in these blocks, and then based on the read-write sets, generating a write set corresponding to the current Merkle state tree and the history Merkle state tree stored in the local database, and then based on the generated write set, updating the data nodes on the current Merkle state tree and the history Merkle state tree of the local database, which will not be repeated in the present disclosure.

In this way, when the latest block corresponding to the Merkle state tree stored by the other node device lags behind the actual latest block of the blockchain, the transactions in the relevant blocks are re-executed to "complete" the current Merkle state tree and the history Merkle state tree that have been synchronized in the local database, thereby ensuring that the Merkle state tree stored in the local database of the node device that synchronizes data is consistent with other node devices in the blockchain network.

In the above technical solution, the account state data in the blockchain is organized into the current Merkle state tree and the history Merkle state tree, so that when a node device synchronizes the data of the Merkle state tree from other node device, the node device only needs to synchronize the current Merkle state tree stored in the local database of other node device to the local, to complete the real-time data synchronization for the Merkle state tree. Moreover, since the current Merkle state tree only maintains the latest account state of each blockchain account, the amount of data is far less than the history Merkle state tree, in this way, it can increase the synchronization rate when synchronizing the Merkle state tree from other node devices.

Corresponding to the above method embodiments, this application also provides embodiments of an apparatus.

Corresponding to the above method embodiments, the present disclosure also provides an embodiment of an apparatus for synchronizing blockchain state data.

The embodiments of the apparatus for synchronizing blockchain state data of the present disclosure can be applied to an electronic device. The apparatus embodiment can be implemented by software, or by hardware or a combination of software and hardware. Taking software implementation as an example, as an apparatus in a logical sense, it is formed by reading the corresponding computer program instructions in the non-volatile memory into the memory through the processor of the electronic device where it is located.

Figure 5:
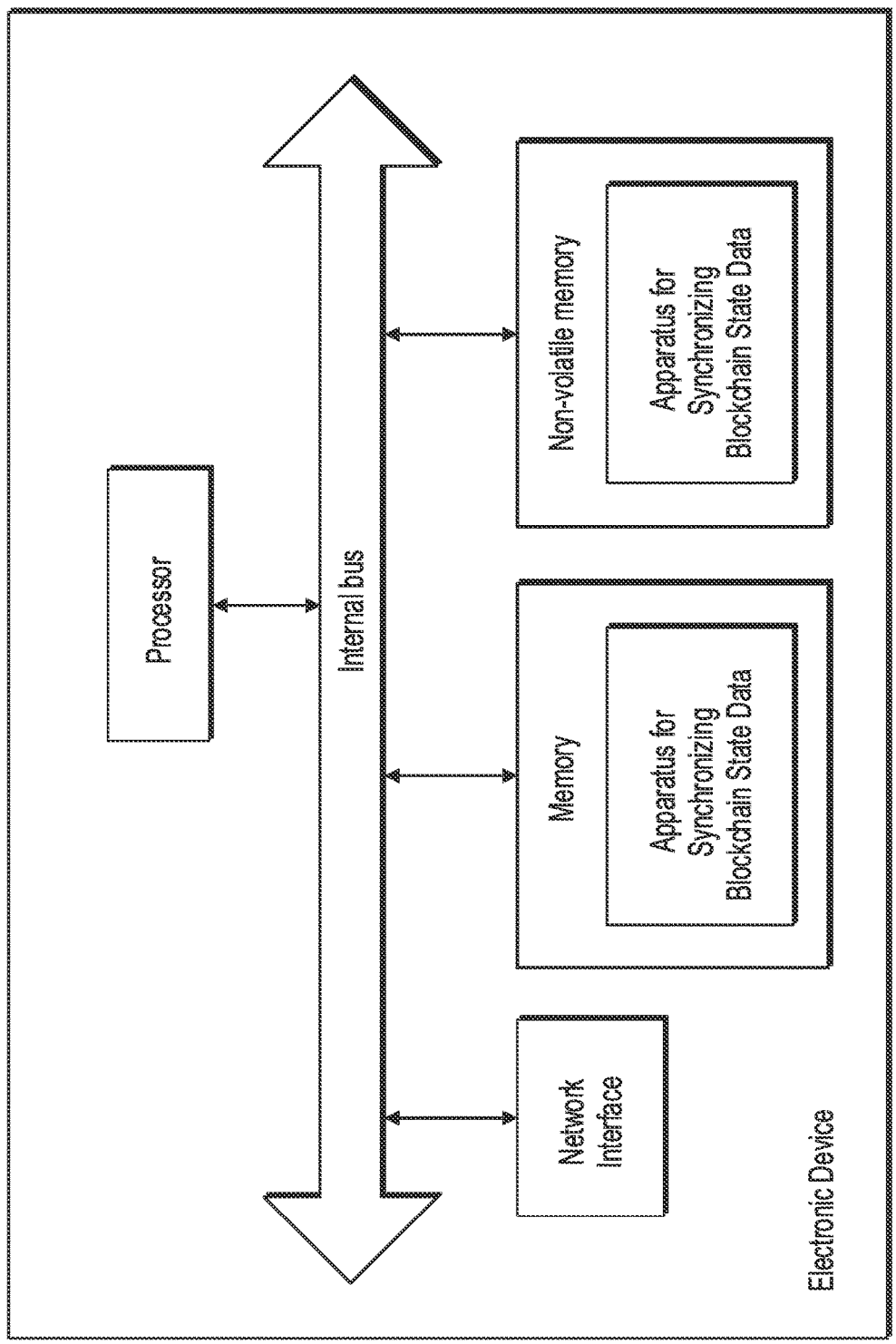
FIG. 5 is a schematic structural diagram of an electronic device, according to an example embodiment.

In terms of hardware, as shown in FIG. 5, which is a hardware structure diagram of the electronic device where the apparatus for synchronizing blockchain state data of the present disclosure is located, in addition to the processor, the memory, the network interface, and the non-volatile memory shown in FIG. 5, the electronic device in which the apparatus is located in the embodiment can generally include other hardware according to the actual function of the electronic device, and details are not described herein again.

Figure 6:
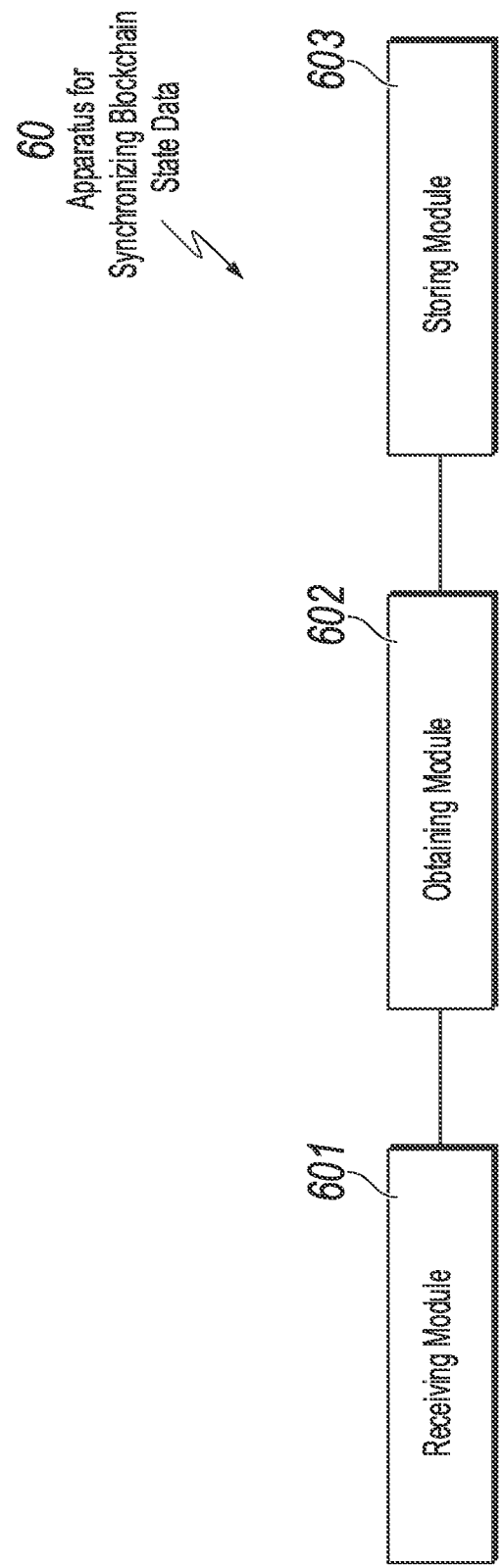
FIG. 6 is a block diagram of an apparatus for synchronizing blockchain state data, according to an example embodiment.

FIG. 6 is a block diagram of an apparatus for synchronizing blockchain state data, according to an example embodiment of the present disclosure.

Referring to FIG. 6, the apparatus 60 for synchronizing blockchain state data can be applied to the electronic device shown in FIG. 6 described above, wherein the account state data in the blockchain is organized into a Merkle state tree and stored in a database; the Merkle state tree includes a current Merkle state tree formed by a latest account state of each blockchain account; and a history Merkle state tree formed by a history account state of each blockchain account; the apparatus 60 includes: a receiving module 601, configured to receive a data synchronization instruction for the Merkle state tree; an obtaining module 602, configured to in response to the data synchronization instruction, obtain in real time the current Merkle state tree of the latest block stored in the database of other node device in the blockchain; and a storing module 603, configured to store the obtained current Merkle state tree of the latest block to the local database to complete real-time data synchronization for the Merkle state tree.

In this embodiment, the obtaining module 602 is further configured to:

in response to the data synchronization instruction, obtain the history Merkle state tree of each block stored in the database of the other node device in the background offline.

The storing module 603 is further configured to: store the obtained history Merkle state tree of each block in the local database to complete offline data synchronization of the history Merkle state tree for the Merkle state tree.

In this embodiment, the device further includes: an updating module 604 (not shown in FIG. 6), configured to determine whether a first block number of the latest block corresponding to the Merkle state tree stored by the other node device is smaller than a second block number of the current latest block of the blockchain; if so, re-execute transactions in all blocks from the first block number to the second block number, to update data nodes on the current Merkle state tree and the history Merkle state tree that have been synchronized to the local database.

In this embodiment, the apparatus further includes: a generation module 605 (not shown in FIG. 6), configured to after execution of a transaction in a target block is completed, based on a latest account state of a target account related to the transaction in the target block after the update, generate updated data nodes corresponding to the current Merkle state tree of the target block and, based on a history account state of the target account before the update, generate history data nodes corresponding to the history Merkle state tree of the target block; a modification module 606 (not shown in FIG. 6), configured to, based on the generated updated data nodes, modify and update data nodes that correspond to the target account, and that are stored in the local database, and that are on the current Merkle state tree of the previous block of the target block, to obtain the current Merkle state tree of the target block; and a creation module 607 (not shown in FIG. 6), configured to, based on the generated history data nodes and data nodes other than the reused data nodes that correspond to the target account that are stored in the local database, and that are on the history Merkle state tree of the previous block of the target block, create the history Merkle state tree for the target block.

In this embodiment, the data nodes on the current Merkle state tree are organized into a data structure of a B+tree, and stored in the database; and the data nodes on the history Merkle state tree are organized into a data structure of an LSM tree, and stored in the database.

In this embodiment, the database is a Key-Value database.

The data nodes on the Merkle state tree are stored in the database in the form of Key-Value pairs; wherein a key of a data node on the current Merkle state tree is a node ID of the data node; a key of a data node on the history Merkle state tree is a hash value of data content contained in the data node.

In this embodiment, the database is a LevelDB database; or a database based on a LevelDB architecture.

In this embodiment, the database is a Rocksdb database based on the LevelDB architecture.

In this embodiment, the Merkle tree is a variant of a Merkle tree with a tree structure incorporating a Trie dictionary tree.

In this embodiment, the Merkle state tree is a Merkle Patricia Tree state tree.

The system, apparatus, module, or unit described in the previous described embodiments can be implemented by a computer chip or entity, or a product with a certain function. A typical implementation device is a computer, and the specific form of the computer can be a personal computer, a laptop computer, a cellular phone, a camera phone, a smart phone, a personal digital assistant, a media player, a navigation device, an email sending and receiving device, and a game console, a tablet computer, a wearable device, or a combination of any of these devices.

In a typical configuration, a computer includes one or more processors (CPUs), an input/output interface, a network interface, and a memory.

The memory can include a non-persistent storage in computer readable media, a random access memory (RAM), and/or a non-volatile memory in a computer-readable medium, such as a read-only memory (ROM) or a flash RAM. The memory is an example of a computer-readable medium.

The computer-readable medium includes either permanent or non-permanent, either removable or non-removable medium, which can store information by any method or technology. Information can be computer-readable instructions, data structures, modules of a program, or other data. Examples of computer storage media include, but are not limited to, a phase change memory (PRAM), a static random access memory (SRAM), a dynamic random access memory (DRAM), other types of random access memory (RAM), and a read-only memory (ROM), an electrically erasable programmable read-only memory (EEPROM), a flash memory or other memory technologies, a read-only disc, a read-only memory (CD-ROM), a digital versatile disc (DVD) or other optical storage, a magnetic tape cartridge, magnetic disk storage, a quantum memory, graphene-based storage media, or other magnetic storage devices or any other non-transmission media can be used to store information that can be accessed by computing devices. As defined herein, computer-readable media does not include temporary computer-readable media (transitory media), such as modulated data signals and carrier waves.

It should also be noted that the terms "including", "comprising" or any other variation thereof are intended to cover non-exclusive inclusion, so that a process, a method, a product or a device that includes a series of elements includes not only those elements, but also includes other elements that are not explicitly listed, or elements that are inherent to such process, method, product, or device. Without more restrictions, the elements defined by the sentence "including a . . . " do not exclude the existence of other identical elements in the process, method, product or device including the elements.

The specific embodiments of the present disclosure have been described above. Other embodiments are within the scope of the following claims. In some cases, the actions or steps recited in the claims can be performed in a different order than in the embodiments and the desired result can still be achieved. In addition, the processes depicted in the figures do not necessarily require the particular order shown or sequential order to achieve the desired results. In some embodiments, multitasking and parallel processing are also possible or can be advantageous.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like can be used in the present disclosure to describe various information, such information should not be limited to these terms. These terms are only used to distinguish one category of information from another. For example, without departing from the scope of the present disclosure, first information can be referred as second information; and similarly, second information can also be referred as first information. Depending on the context, the word "if" as used herein can be interpreted as "when" or "upon" or "in response to determining".

The above descriptions are merely preferred embodiments of one or more embodiments of the present disclosure, and are not intended to limit one or more embodiments of the present disclosure. Wherever within the spirit and principle of one or more embodiments of the present disclosure, any modification, equivalent replacement, improvement, etc. should be included in the protection scope of one or more embodiments of the present disclosure.

What is claimed is:

1. A computer-implemented method of synchronizing blockchain state data, comprising:
receiving, at a blockchain node device in a blockchain, a data synchronization instruction, wherein the blockchain node device is in recovery from a crash or is a new node in the blockchain;
in response to receiving the data synchronization instruction, obtaining in real time, at the blockchain node device, a current Merkle state tree of a latest block stored in a database of another blockchain node device in the blockchain,
wherein the database of the other blockchain node device stores the current Merkle state tree of the latest block and a history Merkle state tree, wherein the current Merkle state tree and the history Merkle state tree are distinct Merkle state trees that store respective non-identical sets of data, wherein at least some data stored in the history Merkle state tree is blockchain account data not stored in the current Merkle state tree, and wherein a storage size of the current Merkle state tree is less than a storage size of the history Merkle state tree, and
wherein the current Merkle state tree of the latest block stored in the database of the other blockchain node device is formed by a latest account state of blockchain accounts of the blockchain, and wherein the history Merkle state tree stored in the database of the other blockchain node device is formed by historical account states of the blockchain accounts of the blockchain;
storing the obtained current Merkle state tree of the latest block to a local database of the blockchain node device to complete real-time data synchronization;
at a later time, subsequent to storing the obtained current Merkle state tree of the latest block, obtaining, at the blockchain node device, the history Merkle state tree stored in the database of the other blockchain node device; and
storing the obtained history Merkle state tree in the local database of the blockchain node device.

2. The computer-implemented method of claim 1, further comprising:
determining, by the blockchain node device, that a first block number of the latest block stored in the database of the other blockchain node device is smaller than a second block number of a current latest block of the blockchain; and
in response to determining that the first block number of the latest block stored in the database of the other blockchain node device is smaller than the second block number of the current latest block of the blockchain, re-executing, by the blockchain node device, transactions in all blocks from the first block number to the second block number, to update data nodes on the stored obtained current Merkle state tree and the stored obtained history Merkle state tree that have been synchronized to the local database of the blockchain node device.

3. The computer-implemented method of claim 2, further comprising:
after execution of a transaction in a target block is completed, based on a latest account state of a target account related to the transaction after execution of the transaction, modifying and updating, by the blockchain node device, data nodes that correspond to the target account on a current Merkle state tree of a previous block adjacent to the target block, to obtain a current Merkle state tree of the target block;
based on a history account state of the target account before execution of the transaction, generating, by the blockchain node device, history data nodes corresponding to a history Merkle state tree of the target block; and
based on (i) the generated history data nodes and (ii) data nodes other than data nodes corresponding to the target account on a history Merkle state tree of the previous block adjacent to the target block, creating, by the blockchain node device, the history Merkle state tree of the target block.

4. The computer-implemented method of claim 1, wherein data nodes on the stored obtained current Merkle state tree are organized into a data structure of a balance+ tree; and
wherein data nodes on the stored obtained history Merkle state tree are organized into a data structure of a Log-Structured Merge Tree.

5. The computer-implemented method of claim 1, wherein the local database is a Key-Value database;
wherein data nodes on the stored obtained current Merkle state tree and data nodes on the stored obtained history Merkle state tree are stored in the form of Key-Value pairs;
wherein a key of each data node on the stored obtained current Merkle state tree is a node ID of the data node; and
wherein a key of each data node on the stored obtained history Merkle state tree is a hash value of data content contained in the data node.

6. The computer-implemented method of claim 1, wherein the local database is a LevelDB database or a database based on a LevelDB architecture.

7. The computer-implemented method of claim 1, wherein obtaining the current Merkle state tree comprises immediately creating, by the blockchain node device, a thread and, using the thread, obtaining the current Merkle state tree through a connection between the blockchain node device and the other blockchain node device.

8. A non-transitory, computer-readable medium storing one or more instructions that, when executed by a computer system, cause the computer system to perform operations for synchronizing blockchain state data, the operations comprising:
receiving, at a blockchain node device in a blockchain, a data synchronization instruction, wherein the blockchain node device is in recovery from a crash or is a new node in the blockchain;
in response to receiving the data synchronization instruction, obtaining in real time, at the blockchain node device, a current Merkle state tree of a latest block stored in a database of another blockchain node device in the blockchain,
wherein the database of the other blockchain node device stores the current Merkle state tree of the latest block and a history Merkle state tree, wherein the current Merkle state tree and the history Merkle state tree are distinct Merkle state trees that store respective non-identical sets of data, wherein at least some data stored in the history Merkle state tree is blockchain account data not stored in the current Merkle state tree, and wherein a storage size of the current Merkle state tree is less than a storage size of the history Merkle state tree, and
wherein the current Merkle state tree of the latest block stored in the database of the other blockchain node device is formed by a latest account state of blockchain accounts of the blockchain, and wherein the history Merkle state tree stored in the database of the other blockchain node device is formed by historical account states of the blockchain accounts of the blockchain;
storing the obtained current Merkle state tree of the latest block to a local database of the blockchain node device to complete real-time data synchronization;
at a later time, subsequent to storing the obtained current Merkle state tree of the latest block, obtaining, at the blockchain node device, the history Merkle state tree stored in the database of the other blockchain node device; and
storing the obtained history Merkle state tree in the local database of the blockchain node device.

9. The non-transitory, computer-readable medium of claim 8, wherein the operations further comprise:
determining, by the blockchain node device, that a first block number of the latest block stored in the database of the other blockchain node device is smaller than a second block number of a current latest block of the blockchain; and
in response to determining that the first block number of the latest block stored in the database of the other blockchain node device is smaller than the second block number of the current latest block of the blockchain, re-executing, by the blockchain node device, transactions in all blocks from the first block number to the second block number, to update data nodes on the stored obtained current Merkle state tree and the stored obtained history Merkle state tree that have been synchronized to the local database of the blockchain node device.

10. The non-transitory, computer-readable medium of claim 9, wherein the operations further comprise:
after execution of a transaction in a target block is completed, based on a latest account state of a target account related to the transaction after execution of the transaction, modifying and updating, by the blockchain node device, data nodes that correspond to the target account on a current Merkle state tree of a previous block adjacent to the target block, to obtain a current Merkle state tree of the target block;
based on a history account state of the target account before execution of the transaction, generating, by the blockchain node device, history data nodes corresponding to a history Merkle state tree of the target block; and
based on (i) the generated history data nodes and (ii) data nodes other than data nodes corresponding to the target account on a history Merkle state tree of the previous block adjacent to the target block, creating, by the blockchain node device, the history Merkle state tree of the target block.

11. The non-transitory, computer-readable medium of claim 8, wherein data nodes on the stored obtained current Merkle state tree are organized into a data structure of a balance+tree; and wherein data nodes on the stored obtained history Merkle state tree are organized into a data structure of a Log-Structured Merge Tree.

12. The non-transitory, computer-readable medium of claim 8, wherein the local database is a Key-Value database;

wherein data nodes on the stored obtained current Merkle state tree and data nodes on the stored obtained history Merkle state tree are stored in the form of Key-Value pairs;

wherein a key of each data node on the stored obtained current Merkle state tree is a node ID of the data node; and wherein a key of each data node on the stored obtained history Merkle state tree is a hash value of data content contained in the data node.

13. The non-transitory, computer-readable medium of claim 8, wherein the local database is a LevelDB database or a database based on a LevelDB architecture.

14. A computer-implemented system, comprising:
one or more computers; and
one or more computer memory devices interoperably coupled with the one or more computers and having tangible, non-transitory, machine-readable media storing one or more instructions that, when executed by the one or more computers, cause the one or more computers to perform one or more operations for synchronizing blockchain state data, the operations comprising:
receiving, at a blockchain node device in a blockchain, a data synchronization instruction, wherein the blockchain node device is in recovery from a crash or is a new node in the blockchain;
in response to receiving the data synchronization instruction, obtaining in real time, at the blockchain node device, a current Merkle state tree of a latest block stored in a database of another blockchain node device in the blockchain,
wherein the database of the other blockchain node device stores the current Merkle state tree of the latest block and a history Merkle state tree, wherein the current Merkle state tree and the history Merkle state tree are distinct Merkle state trees that store respective non-identical sets of data, wherein at least some data stored in the history Merkle state tree is blockchain account data not stored in the current Merkle state tree, and wherein a storage size of the current Merkle state tree is less than a storage size of the history Merkle state tree, and
wherein the current Merkle state tree of the latest block stored in the database of the other blockchain node device is formed by a latest account state of blockchain accounts of the blockchain, and wherein the history Merkle state tree stored in the database of the other blockchain node device is formed by historical account states of the blockchain accounts of the blockchain;
storing the obtained current Merkle state tree of the latest block to a local database of the blockchain node device to complete real-time data synchronization;

at a later time, subsequent to storing the obtained current Merkle state tree of the latest block, obtaining, at the blockchain node device, the history Merkle state tree stored in the database of the other blockchain node device; and storing the obtained history Merkle state tree in the local database of the blockchain node device.

15. The computer-implemented system of claim 14, wherein the operations further comprise:
determining, by the blockchain node device, that a first block number of the latest block stored in the database of the other blockchain node device is smaller than a second block number of a current latest block of the blockchain; and
in response to determining that the first block number of the latest block stored in the database of the other blockchain node device is smaller than the second block number of the current latest block of the blockchain, re-executing, by the blockchain node device, transactions in all blocks from the first block number to the second block number, to update data nodes on the stored obtained current Merkle state tree and the stored obtained history Merkle state tree that have been synchronized to the local database of the blockchain node device.

16. The computer-implemented system of claim 15, wherein the operations further comprise:
after execution of a transaction in a target block is completed, based on a latest account state of a target account related to the transaction after execution of the transaction, modifying and updating, by the blockchain node device, data nodes that correspond to the target account on a current Merkle state tree of a previous block adjacent to the target block, to obtain a current Merkle state tree of the target block;
based on a history account state of the target account before execution of the transaction, generating, by the blockchain node device, history data nodes corresponding to a history Merkle state tree of the target block; and
based on (i) the generated history data nodes and (ii) data nodes other than data nodes corresponding to the target account on a history Merkle state tree of the previous block adjacent to the target block, creating, by the blockchain node device, the history Merkle state tree of the target block.

17. The computer-implemented system of claim 14, wherein data nodes on the stored obtained current Merkle state tree are organized into a data structure of a balance+ tree; and wherein data nodes on the stored obtained history Merkle state tree are organized into a data structure of a Log-Structured Merge Tree.

18. The computer-implemented system of claim 14, wherein the local database is a Key-Value database;
wherein data nodes on the stored obtained current Merkle state tree and data nodes on the stored obtained history Merkle state tree are stored in the form of Key-Value pairs;
wherein a key of each data node on the stored obtained current Merkle state tree is a node ID of the data node; and
wherein a key of each data node on the stored obtained history Merkle state tree is a hash value of data content contained in the data node.

* * * * *